United States Patent
Miyazono (10) Patent No.: US 10,520,011 B2
(45) Date of Patent: Dec. 31, 2019

(54) CRANKSHAFT FOR V6 ENGINE

(71) Applicant: TOYOTA JIDOSHA KABUSHIKI KAISHA, Toyota-shi (JP)

(72) Inventor: Yuya Miyazono, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/232,106

(22) Filed: Dec. 26, 2018

(65) Prior Publication Data

US 2019/0264731 A1    Aug. 29, 2019

(30) Foreign Application Priority Data

Feb. 26, 2018  (JP) .................. 2018-032256

(51) Int. Cl.
*F16C 3/10* (2006.01)
*F02B 75/22* (2006.01)
*F02B 75/18* (2006.01)

(52) U.S. Cl.
CPC ............. *F16C 3/10* (2013.01); *F02B 75/22* (2013.01); *F02B 2075/1824* (2013.01)

(58) Field of Classification Search
CPC ............................ F16C 3/10; F02B 2075/1824
See application file for complete search history.

(56) References Cited

U.S. PATENT DOCUMENTS

| 4,886,023 A * | 12/1989 | Werner | F02B 75/22 123/197.4 |
| 5,481,942 A * | 1/1996 | Baek | F02B 75/22 123/192.2 |
| 2013/0319173 A1* | 12/2013 | Walters | F16C 3/08 74/596 |

FOREIGN PATENT DOCUMENTS

| JP | 2008-224015 | 9/2008 |
| JP | 2014-040856 | 3/2014 |

* cited by examiner

*Primary Examiner* — Vicky A Johnson
(74) *Attorney, Agent, or Firm* — Oblon, McClelland, Maier & Neustadt, L.L.P.

(57) ABSTRACT

The first to ninth crank webs are roughly divided into three groups. The first group is from the second, fifth and eighth webs. These crank webs of the first group have similar shapes. In the crankshaft, the shapes of these crank webs belonging to the first group are adjusted to satisfy the first stiffness condition below.

First stiffness condition: the second and eighth webs>the fifth web W5

2 Claims, 7 Drawing Sheets

POSITION OF NODE MOVES

CRANKSHAFT FOR V6 ENGINE

CROSS-REFERENCE TO RELATED APPLICATION

The present disclosure claims priority under 35 U.S.C. § 119 to Japanese Patent Application No. 2018-032256, filed on Feb. 26, 2018. The contents of the application is incorporated herein by reference in their entirety.

TECHNICAL FIELD

The present disclosure relates to a crankshaft for V6 engine.

BACKGROUND

JP2014-40856A discloses a crankshaft for straight-for engine. This crankshaft includes two flanges, five crank journals, four crank pins and eight crank arms connecting the crank journals and the crank pins. One of the flanges is fitted with a flywheel. In this crankshaft, width and thickness of each crank arm are designed so that stiffness of the crank arm (i.e., bending stiffness and torsional stiffness) increases as a distance from the crank arm to an attachment part of the flywheel decreases.

According to the crankshaft described above, it is possible to reduce noise and vibration of the engine by suppressing wobbling deformation of the flywheel. However, in a V6 engine, there is a vibration mode in which the whole crankshaft is deformed. Therefore, it is not sufficient for noise and vibration of the V6 engine only by suppressing the wobbling deformation of the flywheel.

The present disclosure addresses the problem described above, and an object of the present disclosure is, to provide a crankshaft for V6 engine capable of reducing the noise and vibration of the V6 engine.

SUMMARY

A first aspect of the present disclosure is a crankshaft for V6 engine for solving the problem described above and has the following features.

The crankshaft includes a first journal, a second journal, a third journal and a fourth journal that are provided in an order from front to back of the V6 engine.

The crankshaft includes a first pin, a second pin, a third pin, a fourth pin, a fifth pin and a sixth pin.

The first and second pins are provided between the first and second journals.

The third and fourth pins are provided between the second and third journals.

The fifth and sixth pins are provided between the third and fourth journals.

The crankshaft includes a first web, a second web, a third web, a fourth web, a fifth web, a sixth web, a seventh web, an eighth web and a ninth web.

The first web connects the first journal and the first pin.
The second web connects the first and second pins.
The third web connects the second pin and the second journal.
The fourth web connects the second journal and the third pin.
The fifth web connects the third and fourth pins.
The sixth web connects the fourth pin and the third journal.
The seventh web connects the third journal and the fifth pin.
The eighth web connects the fifth and sixth pins.
The ninth web connects the sixth pin and the fourth journal.

The first to ninth webs are classified into three groups based on their web shapes.

The second, fifth and eighth webs are classified into a first group.
The first and ninth webs are classified into a second group.
The third, fourth, sixth and seventh webs are classified into a third group.

Within the first group, stiffness of the second and eighth webs are higher than that of the fifth web.

A second aspect of the present disclosure has the following features according to the first aspect.

Within the second group, the stiffness of the ninth web is higher than that of the first web.

The inventor of the present disclosure found that relative increase in the stiffness of the second and eighth webs within the first group greatly increases mode frequency of three joint bending mode. The inventor also found that when the mode frequency increases greatly, runout of the crankshaft in a central axis direction decreases. The first aspect is based on these findings. According to the first aspect, within the first group, the stiffness of the second and eighth webs are higher than that of the fifth web. Therefore, it is possible to reduce the noise and vibration of the V6 engine.

The inventor also found that relative increase in the stiffness of the ninth web slightly within the second group increases the mode frequency, and when this relative increase within the second group is combined with that within the first group, the runout of the crankshaft in the central axis direction decreases further. The second aspect is based on these findings. According to the second aspect, within the second group, the stiffness of the ninth webs are higher than that of the first web. Therefore, it is possible to further reduce the noise and vibration of the V6 engine.

DESCRIPTION OF EMBODIMENT

Hereinafter, an embodiment of the present disclosure will be described based on the accompanying drawings. Note that elements that are common to the respective drawings are denoted by the same reference characters and a duplicate description thereof is omitted. Further, the present disclosure is not limited to the embodiment described hereinafter.

1. Configuration of Crankshaft

Figure 1:
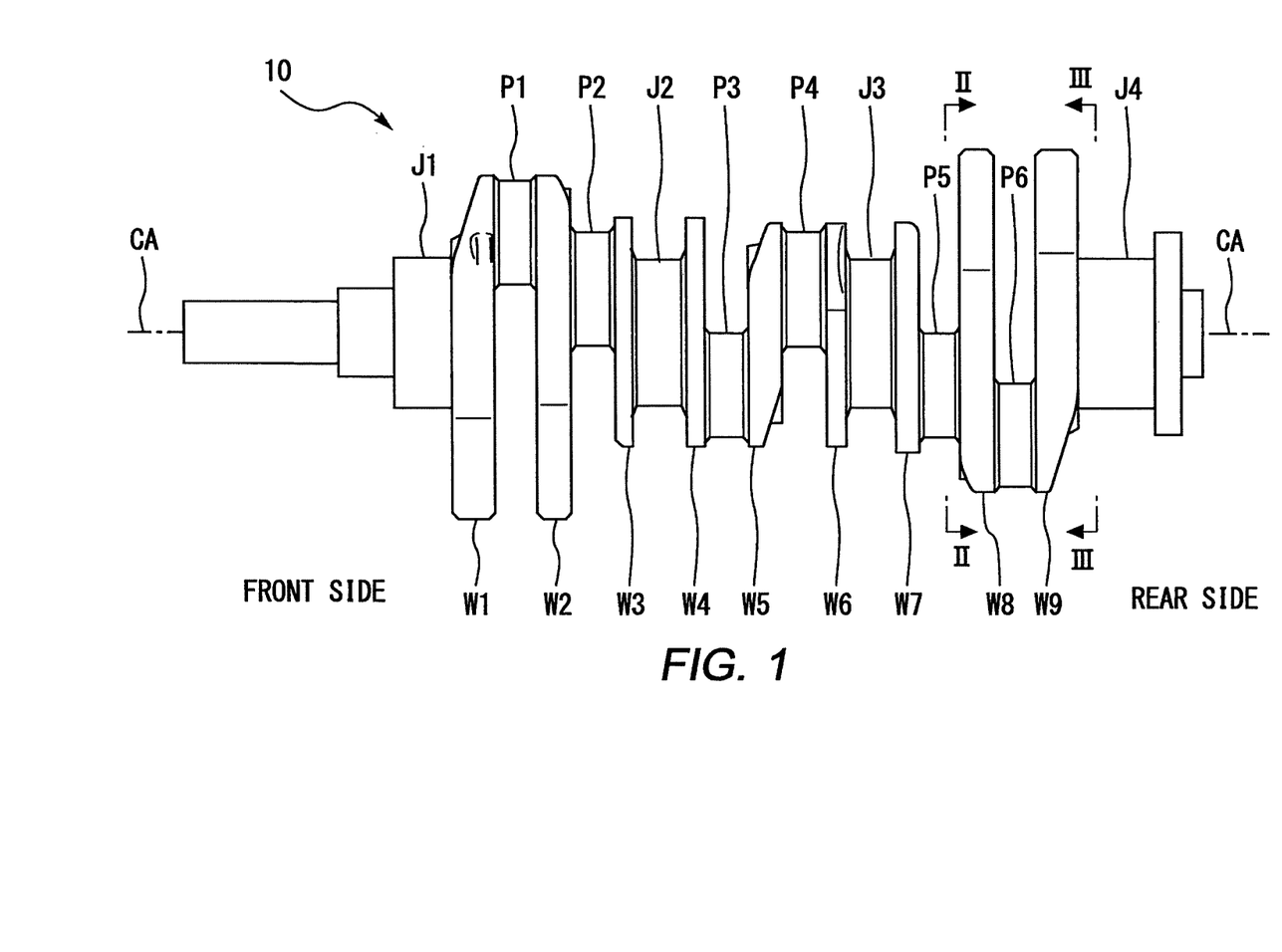
FIG. 1 is a side view of a crankshaft according to an embodiment of the present disclosure.

FIG. 1 is a side view of a crankshaft according to an embodiment of the present disclosure. A crankshaft 10 shown in FIG. 1 is applied to a V6 engine with a bank angle of 60° which is mounted on a vehicle. The crankshaft 10 includes four crank journals (i.e., a first to a fourth journals) J1 to J4, six crankpins (i.e., a first to a sixth crankpins) P1 to P6 and nine crank webs (a first to a ninth webs) W1 to W9.

The crank journals J1 to J4 are substantially cylindrical. The crank journals J1 to J4 are arranged in this order. The crank journals J1 to J4 are located on the same axis. The axis is a central axis CA of the crankshaft 10. The crank journals J1 to J4 are supported by a cylinder block (not shown) via journal bearings (not shown). Hence, the crankshaft 10 is rotatably supported by the cylinder block. Hereinafter, a side of the first journal J1 in the axial direction of the central axis CA will be described as a front side of the engine while a side of the fourth journal J4 will be described as a rear side of the engine.

Likewise the crank journals J1 to J4, the crankpins P1 to P6 are substantially cylindrical. The first pin P1 and the second pin P2 are arranged in this order between the first journal J1 and the second journal J2. The third pin P3 and the fourth pin P4 are arranged in this order between the second journal J2 and the third journal J3. The fifth pin P5 and the sixth pin P6 are arranged in this order between the third journal J3 and the fourth journal J4. Connecting rods (not shown) are attached to the crank pins P1 to P6, respectively. Each of the connecting rods corresponds to each cylinder of the V6 engine. Specifically, the first pin P1 corresponds to the connecting rod of a first cylinder, and the second pin P2 corresponds to that of a second cylinder. In other words, the order of the pins match with the number of the cylinders.

The crank webs W1 to W9 are arranged in this order between the crank journals J1 to J4. The first web W1 connects the first journal J1 and the first pin P1. The second web W2 connects the first pin P1 and the second pin P2. The third web W3 connects the second pin P2 and the second journal J2. The fourth web W4 connects the second journal J2 and the third pin P3. The fifth web W5 connects the third pin P3 and the fourth pin P4. The sixth web W6 connects the fourth pin P4 and the third journal J3. The seventh web W7 connects the third journal J3 and the fifth pin P5. The eighth web W8 connects the fifth pin P5 and the sixth pin P6. The ninth web W9 connects the sixth pin P6 and the fourth journal J4.

Figure 2:
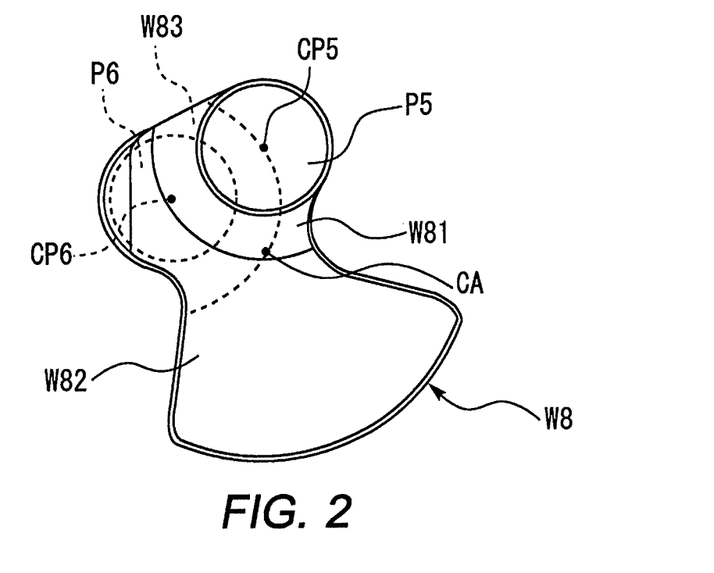
FIG. 2 is a cross-sectional view taken along a line from II to II shown in FIG. 1.

The crank webs W1 to W9 are roughly divided into three groups. The first group G1 is from the second web W2, the fifth web W5 and the eighth web W8. These crank webs have similar shapes. As a representative for these crank webs, a shape of the eighth web W8 is shown in FIG. 2. FIG. 2 is a cross-sectional view taken along a line from II to II shown in FIG. 1. As shown in FIG. 2, the eighth web W8 includes a support part W81 for supporting the fifth pin P5 and a mass part W82 for adding a predetermined mass to a predetermined position of the eighth web W8. The support part W81 is arranged to surround an outer circumference of the fifth pin P5. A center line of a portion surrounding the outer circumference is coincident with a central axis CP5 of the fifth pin P5. The mass part W82, is connected to a part of the outer circumference of the support part W81.

FIG. 2 describes the shape of the eighth web W8 viewed from a side of the fifth pin P5. Note that, based on FIG. 2, it is easily understood that a support part W83 for supporting the sixth pin P6 is provided separately when viewing the eighth web W8 from a side of the sixth pin P6. In other words, the eighth web W8 includes the support part W83 in addition to the support part W81 and the mass part W82. The support part W83 is arranged to surround an outer circumference of the sixth pin P6. A center line of a portion surrounding the outer circumference is coincident with a central axis CP6 of the sixth pin P6.

Figure 3:
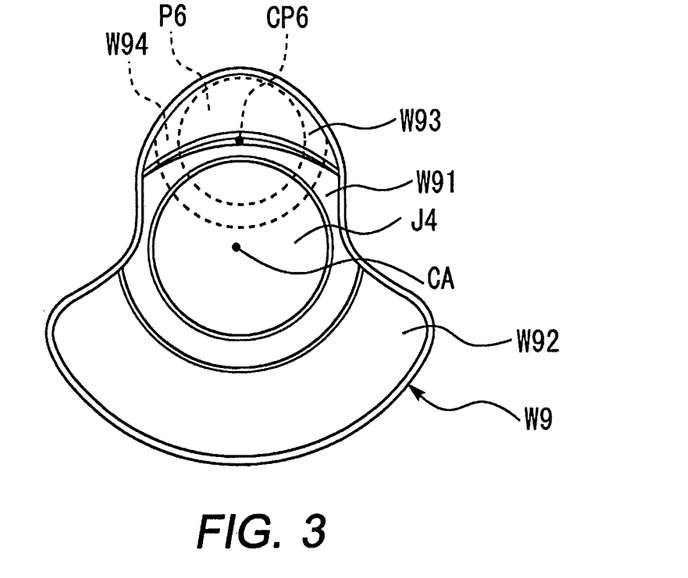
FIG. 3 is a cross-sectional view taken along a line from III to III shown in FIG. 1.

The second group G2 is from the first web W1 and the ninth web W9. These crank webs have similar shapes. As a representative for these crank webs, a shape of the ninth web W9 is shown in FIG. 3. FIG. 3 is a cross-sectional view taken along a line from III to III shown in FIG. 1. As shown in FIG. 3, the ninth web W9 includes a support part W91 for supporting the fourth journal J4 and mass parts W92 and W93 for adding predetermined mass to predetermined positions of the ninth web W9. The support part W91 is arranged to surround an outer circumference of the fourth journal J4. A center line of a portion surrounding this outer circumference is coincident with the central axis of the fourth journal J4 (i.e., the central axis CA). The mass parts W92 and W93 are connected to a part of an outer circumference of the support part W91.

FIG. 3 describes the shape of the ninth web W9 viewed from a side of the fourth pin P4. Note that, based on FIG. 3, it is easily understood that a support part W94 for supporting the sixth pin P6 is provided separately when viewing the ninth web W9 from a side of the sixth pin P6. In other words, the ninth web W9 includes the support part W94 in addition to the support part W91 and the mass parts W92 and W93. The support part W94 is arranged to surround the outer circumference of the sixth pin P6. A center line of a portion surrounding the outer circumference is coincident with the central axis CP6.

The third group G3 is from the third web W3, the fourth web W4, the sixth web W6 and the seventh web W7. These crank webs have similar shapes. The shapes of these crank webs are not particularly limited in the present disclosure. Hence, the description for the shapes will be omitted.

2. Features of Crankshaft

As described above, the shapes of the crank webs belonging to the first group G1 are similar to each other. However, in the crankshaft 10, the shapes of these crank webs are adjusted to satisfy a first stiffness condition described below.

> First stiffness condition: the second web W2 and the eighth web W8 > the fifth web W5

The shapes of the crank webs belonging to the second group G2 are similar to each other. However, in the crankshaft 10, the shapes of these crank webs may be adjusted to satisfy a second stiffness condition described below.

> Second stiffness condition: the ninth web W9 > the first web W1

That is, the crankshaft 10 may be adjusted to simultaneously satisfy the first and second stiffness conditions by adjusting the shapes of the crank webs belonging to the first group G1 and the second group G2.

3. Principle

When the first stiffness condition is satisfied, position of a node moves in the three joint bending mode in which the entire crankshaft 10 is deformed thereby an engine vibration is suppressed. Herein, the three joint bending mode is a secondary bending mode in a vertical plane direction of the cylinder block including the central axis CA of the crankshaft. Also, if the first and second stiffness conditions are simultaneously satisfied, the engine vibration is further suppressed. Hereinafter, effects due to the configuration of this crankshaft 10 will be described in detail.

3.1 Relationship Between Vibratory Force Due to Combustion and Noise and Vibration (Hereinafter Simply Referred to as "NV")

When fuel burns in a cylinder of the V6 engine, a vibration force is generated. The vibration force generated in the cylinder is transmitted to the crankshaft to excite the vibration of each part of the engine. Each part of the engine includes a bottom block and a V-bank part of the cylinder and the cylinder head. When each part of the engine vibrates, it excites the vibration of a drive system such as including a transmission, a clutch damper and a drive shaft. These vibrations are input together into a car body. The inputted vibrations to the vehicle body combines further with resonance of a body shell, various lids and a cabin cavities thereby NV at an occupant position is generated.

Figure 4:
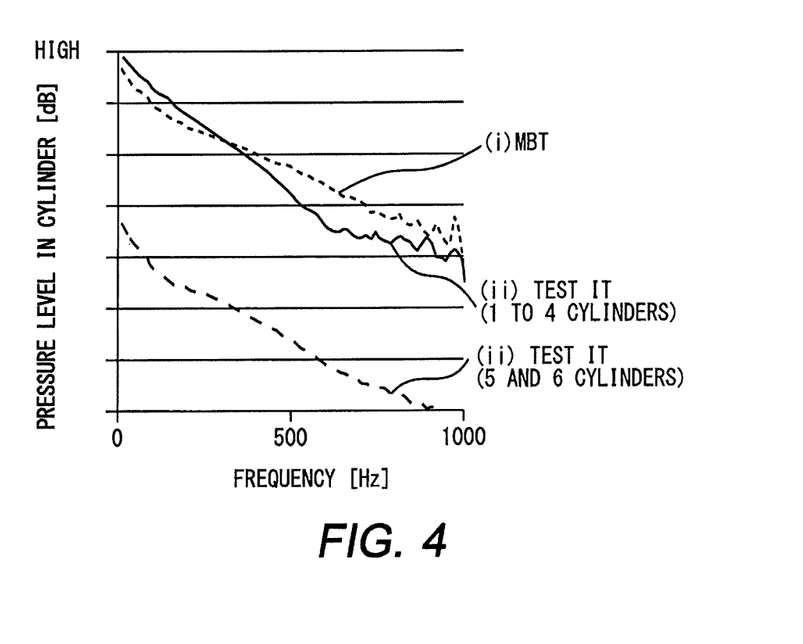
FIG. 4 is a diagram for showing an example of pressure levels in the cylinder of the V6 engine to which a conventional crankshaft is applied.

FIG. 4 is a diagram for showing an example of pressure levels in the cylinder of the V6 engine to which a conventional crankshaft is applied. The conventional crankshaft is different from the crankshaft according to the present disclosure in terms of the stiffness of the crank webs. That is, in the conventional crankshaft, the stiffness of the crank webs belonging to each group of the first group G1 to the third group G3 are equal for each group. The pressure level shown in FIG. 4 is calculated by Fourier transformation on the pressure in the cylinder obtained during the V6 engine is operated based on two types of ignition timing. Specifically, the two types of ignition timing are (i) MBT (Minimum advance for the Best Torque) and (ii) test ignition timing (hereinafter also referred to as "test IT"). The (ii) test IT is an ignition timing which is set on a retard side by a predetermined crank angle as compared with the (i) MBT.

The higher the pressure level, the greater the vibration force. And also, the lower the pressure level, the lower the vibration force. Therefore, from the pressure level shown in FIG. 4, the following is able to understand. That is, the combustion force of the fifth cylinder or the sixth cylinder in the (ii) test IT has a small vibration force, and that of the first, second, third, or fourth cylinder in the (ii) test IT has a large vibration force. Also, the combustion force of each cylinder in the (i) MBT also has a large vibration force.

Figure 5:
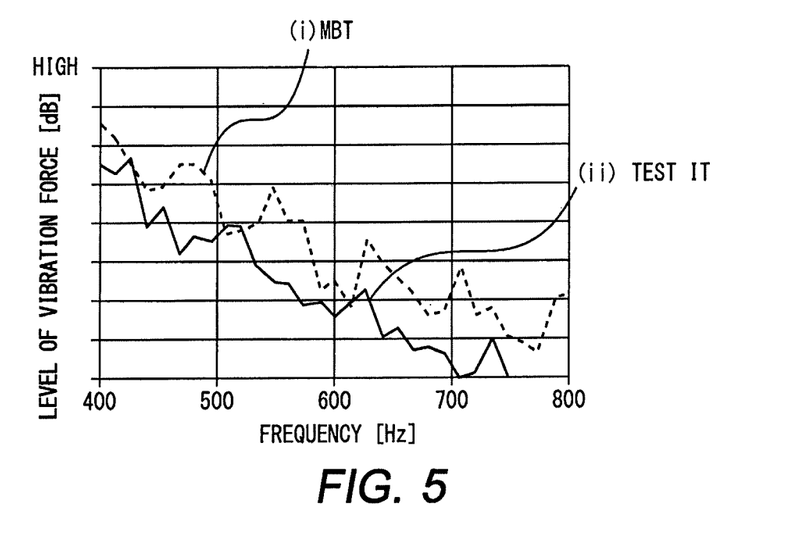
FIG. 5 is a diagram for showing an example of analysis results of the vibration force applied to a bearing of the conventional crankshaft.

FIG. 5 is a diagram for showing an example of analysis results of the vibration force applied to a bearing of the conventional crankshaft. The (i) MBT and (ii) test IT shown in FIG. 5 are the same as the two types of the ignition timing shown in FIG. 4. From the results in FIG. 5, the following is able to understand. That is, combustion in the (ii) test IT has lower vibration and noise level than the combustion in the (i) MBT.

Hence, from the results shown in FIGS. 4 and 5, the following is able to understand. That is, from a viewpoint of NV, the combustion of the (ii) test IT including the combustion of the fifth or sixth cylinder with small vibration force is desirable as compared with that of the (i) MBT. In other words, if emphasis is placed on suppressing NV, it is desirable to retard the ignition timing. However, it is not necessarily appropriate to sacrifice the combustion (torque) to suppress NV.

3.2 Effects of Crank Web Stiffness on NV

Figure 6:
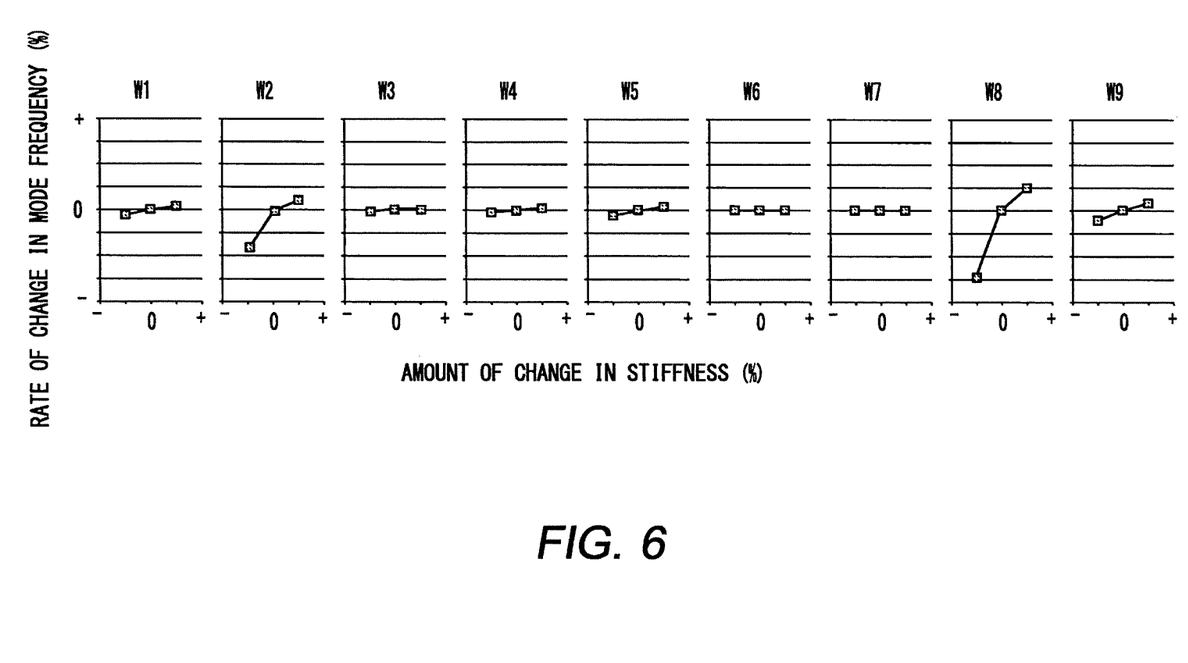
FIG. 6 is a diagram for showing a relationship between amount of change in stiffness of each crank web and rate of change in mode frequency of three joint bending mode.

The present inventor conducted an investigation by a CAE (Computer Aided Engineering) on an influence of the stiffness of the crank webs on NV. FIG. 6 is a diagram for showing results of this investigation. In this figure, a relationship between amount of change in the stiffness of each crank web and rate of change in the mode frequency of three joint bending mode is drawn. As shown in FIG. 6, sensitivity of the rate of change of the mode frequency to the amount of change in the stiffness (hereinafter also referred to as "stiffness sensitivity") is high in the second web W2 and the eighth web W8. In these crank webs, direction of the change in the stiffness matches that in the mode frequency.

The second web W2 and the eighth web W8 are the crank webs belonging to the first group G1. On the other hand, despite belonging to the same group as these crank webs W2 and W8, the stiffness sensitivity of the fifth web W5 is low. Also, when comparing between the first web W1 and the ninth web W9, the stiffness sensitivity of the ninth web W9 is higher than that of the first web W1. Likewise the second web W2 and the eighth web W8, in the ninth web W9, the direction of the change in the stiffness matches that in the mode frequency.

From the investigation results shown in FIG. 6, the following is able to understand. That is, if the stiffness of the second web W2 or the eighth web W8 is relatively increased in the first group G1, the mode frequency increases greatly. Also, if the stiffness of the crank webs other than the second web W2 or the eighth web W8 is relatively lowered in the first group G1, the mode frequency drops greatly. Also, if the stiffness of the ninth Web W9 is relatively increased in the second group G2, the mode frequency slightly increases. Also, if the stiffness of the ninth web W9 is relatively lowered in the second group G2, the mode frequency slightly drops.

Figure 7:
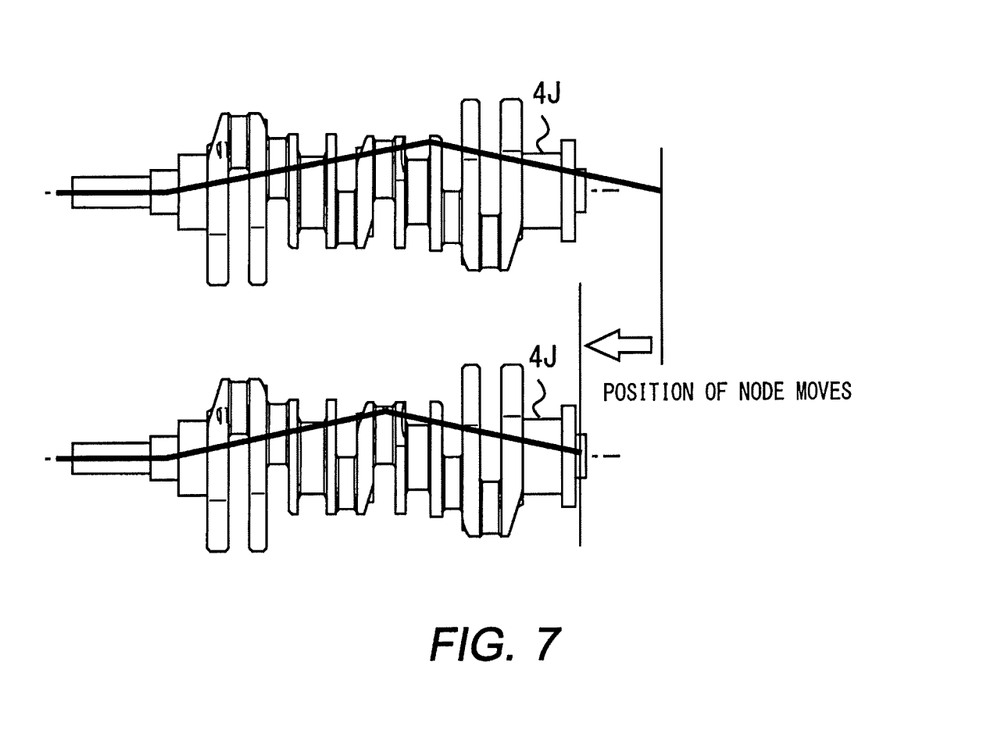
FIG. 7 is a diagram for describing predicted positions of the node of the three joint bending mode before and after the change in the mode frequency.

If the mode frequency changes, the position of the node of the three joint bending mode is predicted to move. FIG. 7 is a diagram for describing predicted positions of the node of the three joint bending mode before and after the change in the mode frequency. As can be seen by comparing the upper row (before change) and the lower row (after change) in FIG. 7, as the mode frequency becomes higher, the position of the node approaches the fourth journal J4. Therefore, runout of the crankshaft in the direction of the central axis CA is reduced. Note that when the mode frequency becomes lower, the position of the node departs from the fourth journal J4. Therefore, the runout of the crankshaft in the direction of the central axis CA is enlarged.

3.3 Advantageous Effects by Change in Stiffness

Based on the investigation results and the predicted position of the node described with reference to FIG. 6, the inventor of the present disclosure measured vibration of a crankshaft prototype (Example 1) satisfying the first stiffness condition at a bottom rail of the fourth cylinder (hereinafter referred to as "bottom rail vibration"). In addition, the bottom rail vibration was also measured for another prototype (Example 2) satisfying the second stiffness condition. The results of these measurements are shown in FIG. 8.

Figure 8:
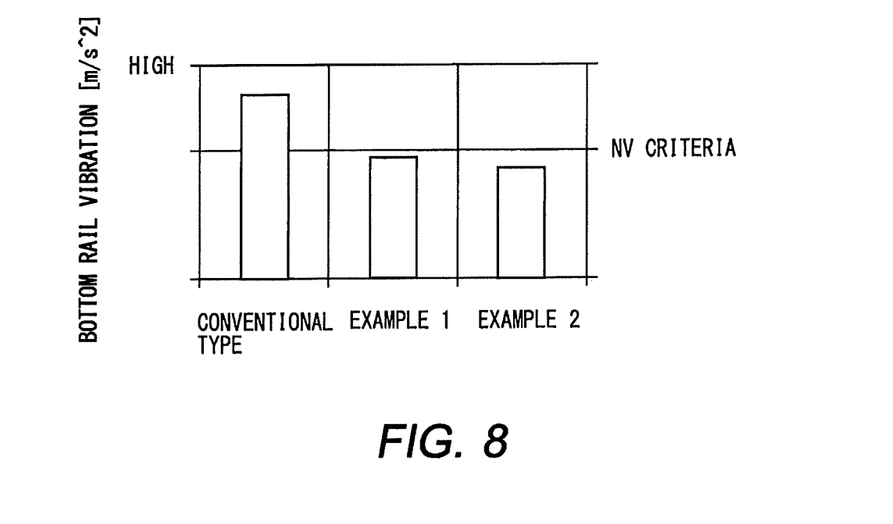
FIG. 8 is a diagram for showing measurement results of the bottom rail vibration of the V6 engine to which the crankshaft of the present disclosure is applied.

From the measurement results shown in FIG. 8, the following is able to understand. That is, according to the crankshaft of Example 1, it is possible to suppress the bottom rail vibration as compared with that of the comparative example (i.e., the conventional crankshaft described above). According to the crankshaft of Example 2, it is possible to suppress the bottom rail vibration further than the crankshaft of Example 1. Herein, the bottom rail vibration has been confirmed to have a high correlation with NV (more specifically, noise in a vehicle compartment) by an actual vehicle test. In other words, the bottom rail vibration may be said as a leading indicator of NV. Hence, the crankshaft of Example 1 or 2 which is able to suppress the bottom rail vibration may be said as an effective countermeasure of NV.

Figure 9:
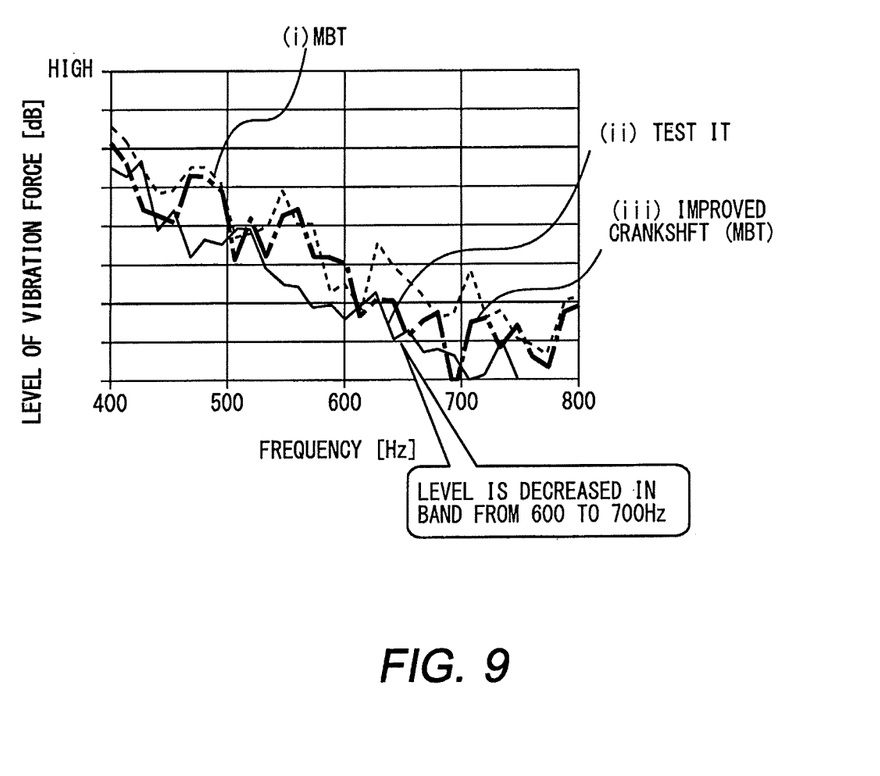
FIG. 9 is a view for showing analysis results of the vibration force applied to the bearing of the crankshaft according to the present disclosure.

FIG. 9 is a view for showing analysis results of the vibration force applied to the bearing of the crankshaft according to the present disclosure. An analysis result of the crankshaft of Example 2 described above corresponds to an improved crankshaft shown with a sign (iii) in FIG. 9. The (i) MBT and (ii) test IT shown in FIG. 9 are analysis results of the vibration force described with reference to FIG. 5. Note that the ignition timing condition for the analysis of the (iii) improved crankshaft is MBT.

From the analysis results shown in FIG. 9, the following is able to understand. That is, the vibration and noise level in the combustion of the (iii) improved crankshaft is lower than that of the (i) MBT. Also, the vibration and noise level in the combustion of the (iii) improved crankshaft at a specific frequency band (more specifically, from 600 to 700 Hz) is equivalent to that of the (ii) test IT. That is, according to the (iii) improved crankshaft, it is possible to suppress NV without sacrificing the combustion (torque) like the (ii) test IT. Also, according to the (iii) improved crankshaft, it is possible to suppress NV to the same level as the (ii) test IT in the specific frequency band.

4. Design Examples of Crank Webs to Satisfy Stiffness Conditions

First, a design example of the shape of the crank webs to satisfy the first stiffness condition is described. In order to satisfy the first stiffness condition, for example, thickness or width of the second web W2 and the eighth web W8 may be made larger than that of the fifth web W5. Herein, the "thickness" means the size of the support part or mass part with reference to the axial direction of the central axis CA. The "width" means the size of the support part or mass part with reference to the direction orthogonal to the central axis CA of crankshaft.

Figure 10:
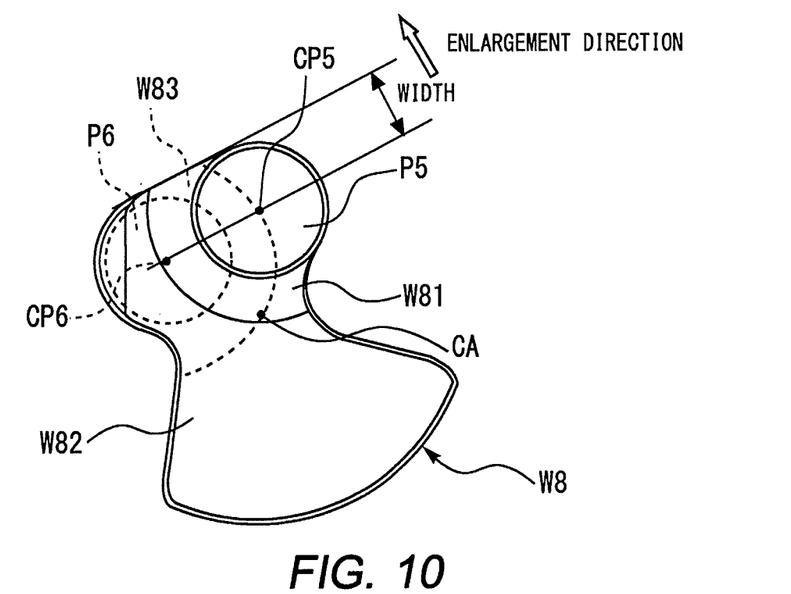
FIG. 10 is a view for showing an example of an enlargement direction of a width of an eighth web W8.

FIG. 10 shows an example of an enlargement direction of the width of the eighth web W8. In the example shown in FIG. 10, the sizes of the support part W81 (or the support part W83 when seeing the eighth web W8 from a side of the sixth pin P6) and the mass part W82 are enlarged in a direction opposite to a direction from the central axis CP5 to the central axis CA. By enlarging the size in the direction along an arrow shown in FIG. 10, it is possible to minimize change in a gravity position of the eighth web W8 being associated with the increase in the stiffness the eighth web W8. Also in a case of enlarging the size of the second web W2, it suffices to follow this example.

Figure 11:
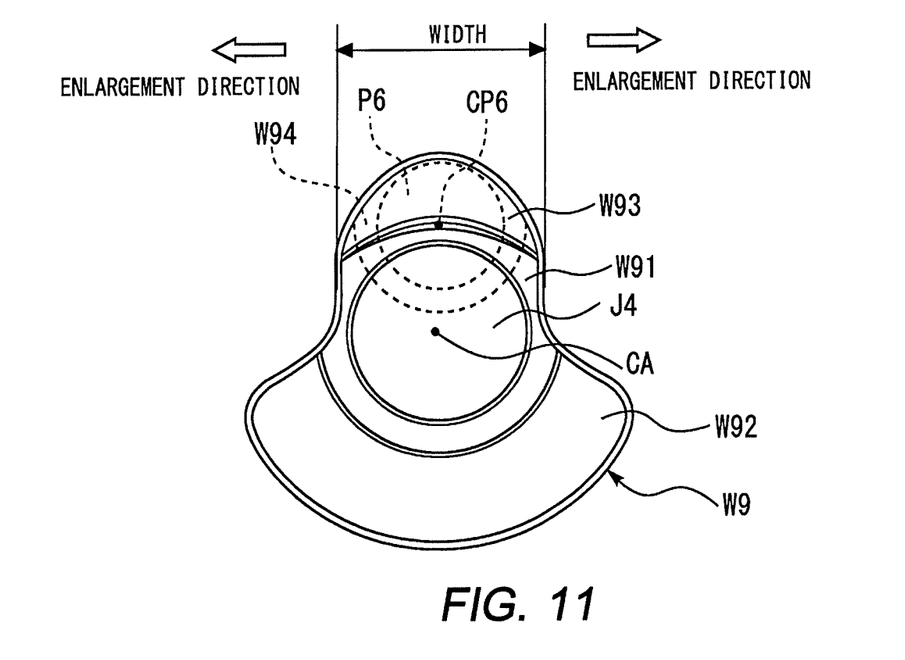
FIG. 11 is a view for showing an example of the enlargement direction of the width of a ninth web W9.

Next, a design example of the shape of the crank webs to satisfy the first and second stiffness conditions. In order to satisfy these conditions at the same time, the thickness or width of the second web W2 and the eighth web W8 are enlarged as described above, while the thickness or width of the ninth web W9 is made larger than that of the first web W1. FIG. 11 shows an example of an enlargement direction of the width of the ninth web W9. In the example shown in FIG. 11, the size of the support part W91 (or the support part W94 when seeing the ninth web W9 from a side of the sixth pin P6) and mass part W93 are enlarged in a side of the mass part W93 relative to the central axis CA. By enlarging the size in the direction along an arrow shown in FIG. 11, it is possible to minimize change in the gravity position of the ninth web W9 being associated with the increase in the stiffness the ninth web W9.

What is claimed is:

1. A crankshaft for V6 engine comprising:
   a first journal, a second journal, a third journal and a fourth journal that are provided in an order from front to back of the V6 engine;
   a first pin, a second pin, a third pin, a fourth pin, a fifth pin and a sixth pin, wherein the first and second pins are provided between the first and second journals, the third and fourth pins are provided between the second and third journals, and the fifth and sixth pins are provided between the third and fourth journals;
   a first web, a second web, a third web, a fourth web, a fifth web, a sixth web, a seventh web, an eighth web and a ninth web, wherein the first web connects the first journal and the first pin, the second web connects the first and second pins, the third web connects the second pin and the second journal, the fourth web connects the second journal and the third pin, the fifth web connects the third and fourth pins, the sixth web connects the fourth pin and the third journal, the seventh web connects the third journal and the fifth pin, the eighth web connects the fifth and sixth pins, and the ninth web connects the sixth pin and the fourth journal;
   wherein the first to ninth webs are classified into three groups based on their web shapes, wherein the second, fifth and eighth webs are classified into a first group, the first and ninth webs are classified into a second group, and the third, fourth, sixth and seventh webs are classified into a third group,
   wherein, within the first group, stiffness of the second and eighth webs are higher than that of the fifth web.

2. The crankshaft for V6 engine according to claim 1, wherein, within the second group, the stiffness of the ninth web is higher than that of the first web.

* * * * *